(12) United States Patent
Levandoski et al.

(10) Patent No.: US 8,119,754 B2
(45) Date of Patent: Feb. 21, 2012

(54) ROOM TEMPERATURE CURING ADHESIVE COMPOSITION HAVING HIGH TEMPERATURE PROPERTIES

(75) Inventors: Susan Lamtroung Levandoski, Bristol, CT (US); Christopher J. Verosky, Coventry, CT (US); Brian M. Czabaj, Essex Junction, VT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 12/633,172

(22) Filed: Dec. 8, 2009

(65) Prior Publication Data

US 2010/0084091 A1    Apr. 8, 2010

Related U.S. Application Data

(63) Continuation of application No. PCT/US2008/007037, filed on Jun. 4, 2008.

(60) Provisional application No. 60/942,895, filed on Jun. 8, 2007.

(51) Int. Cl.
*C08F 220/34* (2006.01)

(52) U.S. Cl. ......... 526/301; 526/262; 526/258; 528/322

(58) Field of Classification Search .................. 526/262, 526/258, 301; 528/322
See application file for complete search history.

(56) References Cited

U.S. PATENT DOCUMENTS

| | | | |
|---|---|---|---|
| 2,895,950 A | 7/1959 | Krieble et al. | |
| 3,046,262 A | 7/1962 | Krieble | |
| 3,425,988 A | 2/1969 | Gorman, et at. | |
| 4,018,851 A | 4/1977 | Baccei | |
| 4,180,640 A | 12/1979 | Doherty et al. | |
| 4,287,330 A | 9/1981 | Rich | |
| 4,295,909 A | 10/1981 | Baccei | |
| 4,309,526 A | 1/1982 | Baccei | |
| RE35,058 E | 10/1995 | Yang et al. | |
| 6,043,327 A * | 3/2000 | Attarwala et al. | 526/259 |
| 6,596,808 B1 * | 7/2003 | Newberth et al. | 524/812 |
| 6,676,795 B1 * | 1/2004 | Levandoski | 156/272.2 |
| 6,846,564 B1 | 1/2005 | Pascault et al. | |
| 2002/0028302 A1 | 3/2002 | Okazaki et al. | |
| 2007/0031660 A1 | 2/2007 | Kanamaru et al. | |

FOREIGN PATENT DOCUMENTS

| | | |
|---|---|---|
| DE | 3320918 | 12/1983 |
| GB | 2121811 | 1/1984 |

* cited by examiner

*Primary Examiner* — Satya Sastri
(74) *Attorney, Agent, or Firm* — Steven C. Bauman

(57) ABSTRACT

Room temperature curing structural adhesive compositions including polyurethane oligomers having multi-methacrylate functionality, cycloalkylmethacrylate, at least one maleimide-functionalized compound and a cure system are disclosed. These compositions exhibit enhanced high temperature properties, including hot strength, heat/humidity strength, and heat aging strength, without compromising initial tensile strength and fixture speeds and still possessing a room temperature cure.

18 Claims, No Drawings

ROOM TEMPERATURE CURING ADHESIVE COMPOSITION HAVING HIGH TEMPERATURE PROPERTIES

RELATED U.S. APPLICATION DATA

This application continues from International Patent Application No. PCT/US2008/007037, filed Jun. 4, 2008, which claims the benefit of an earlier filing date from U.S. Provisional Application No. 60/942,895, filed Jun. 8, 2007 the disclosures of each of which hereby being expressly incorporated herein by reference.

BACKGROUND OF THE INVENTION

1. Field of the Invention

The present invention relates to room temperature (RT) curing adhesive compositions which produce bonds having high strength. More particularly, the present invention relates to RT curing adhesive compositions which fixture rapidly and have excellent high temperature properties, including hot strength and heat aging strength.

2. Brief Description of Related Technology

Great Britain Patent Document No. 2,121,811A, and German Patent Document No. 3,320,918, which appears to be a German counterpart thereof, describe a two-component acrylate adhesive. The first component is reported to have urethane/acrylate block resin, hydroxyethyl methacrylate, cumene hydroperoxide, 1-acetyl-2-phenyl hydrazine, benzene sulfimide, acrylic acid and a chelator. The second component is reported to have urethane/acrylate block resin, hydroxyethyl methacrylate, copper octoate and a chelator. The two components are mixed in a ratio by volume of 1:1. Transition metal accelerators are preferably a salt or complex of copper, nickel, cobalt or iron.

U.S. Pat. No. Re 35,058 describes an aerobically curable adhesive composition, which includes the product of combining a) a polyurethane (meth)acrylate, a (meth)acrylate comonomer other than a polyurethane (meth)acrylate, a free radical initiator and a transition metal-free accelerator and b) a second polyurethane (meth)acrylate, an additional (meth)acrylate comonomer, a drier, such as, a soluble Co, Fe, Zrm, Mn, Ce, Pb, Zn, Ca, Ba, or Y salt of an organic acid, and optionally, a copper, vanadium and nickel accelerator, subject to the proviso that if only one soluble metal salt of an organic acid is utilized in the drier, the transition metal accelerator is also utilized. Within 30 days of combining components a) and b), a surface of the adhesive composition in contact with air is no longer tacky.

U.S. Pat. No. 2,895,950 describes formulations employing hydroperoxide catalysts. Acceleration of the cure of anaerobic formulations with sulfimides, including saccharin (benzoic sulfimide), has been disclosed in U.S. Pat. No. 3,046,262.

U.S. Pat. Nos. 4,180,640 and 4,287,330 describe acyl hydrazine compounds as anaerobic accelerators preferably in combination with an acid having a pKa of about 12 or less.

Notwithstanding the state of technology, fast RT anaerobic curing composition which when cured exhibits excellent high temperature properties such as hot strength and heat aging strength have not been disclosed. There is a need for a composition which provides such physical properties.

SUMMARY OF THE INVENTION

In one aspect of the invention, there is provided a room temperature cure adhesive composition including:
 a) at least one polyurethane oligomer having (meth)acrylate functionality;
 b) a cycloalkyl(meth)acrylate present in the amount of about 10 to about 50% by weight;
 c) at least one maleimide-functionalized compound present in the amount of about 5% to about 30% by weight; and
 d) a cure system comprising at least one peroxide.

In another aspect of the invention, there is provided a process for preparing a room temperature curing adhesive composition having high temperature properties when cured, said process including:
 combining at least one polyurethane oligomer having (meth)acrylate functionality, a cycloalkyl(meth)acrylate present in amounts of about 10% to about 50% by weight; at least one maleimide-functionalized compound present in amounts of about 5% to about 30% by weight, and a cure system including at least one free-radical initiator in an amount sufficient to initiate cure.

In yet another aspect of the invention, there is provided a method of bonding a first substrate and to a second substrate to form a bonded composite thereof, said method comprising the steps of:
 (i) providing a composition including:
  a) at least one polyurethane oligomer having (meth)acrylate functionality;
  b) a cycloalkyl(meth)acrylate present in the amount of about 10 to about 50% by weight;
  c) at least one maleimide-functionalized compound present in the amount of about 5% to about 30% by weight; and
  d) a cure system comprising at least one free-radical initiator;
 (ii) applying such composition to a surface on at least one of the first or second substrates;
 (iii) matingly engaging the first and second substrate at such surface; and
 (iv) permitting the composition to cure.

In one aspect of the invention, there is provided a process for preparing a room temperature curing adhesive having high temperature properties when cured including:
 (a) combining at least one polyurethane oligomer having (meth)acrylate functionality, a cycloalkyl(meth)acrylate, a maleimide-functionalized compound and at least one free-radical initiator as a first component;
 (b) providing a surface activator to produce a second component; and
 (c) contacting the first and second components to produce the room temperature curing adhesive having high temperature properties.

DETAILED DESCRIPTION OF THE INVENTION

It has been discovered that when a combination of cycloalkyl (meth)acrylates and a maleimide-functionalized compound in certain ranges is added to a room temperature curing polyurethane (meth)acrylate, a substantial increase in high temperature properties is obtained, without comprising initial room temperature tensile strength properties, notwithstanding a substantial reduction in the polyurethane (meth)acrylate component present, and without compromising the rapid fixture time, which is desirable in many structural adhesive compositions.

The compositions of the present invention have a wide variety of uses in various industries, including the automotive, consumer, general industrial and electronics industries. These compositions are particularly well-suited for bonding metal substrates including ferrous-containing substrates, copper-containing substrates, stainless steel, zinc dichromate, aluminum and galvanized steel. Non-metal substrates such as wood and plastic may also be bonded with these compositions.

One particularly well-suited application for the present inventive compositions is the bonding of magnets used in motors.

The term "(meth)acrylate" as used herein is intended to include acrylates and methacrylates.

The term "curing" or "cure" as used herein refers to a change in state, condition and/or structure in a material, as well as, partial and complete curing.

The term "partially cured" as used herein means that unreacted crosslinkable material remains which is still capable of crosslinking.

The term "cycloalkyl(meth)acrylate" (CAMA) is intended to cover $C_{5-7}$ cycloalkyl(meth)acrylates including cyclopentylmethacrylate, cyclopentylacrylate, cyclohexylmethacrylate, cyclohexylacrylate, cycloheptylmethacrylate, cycloheptylacrylate; and $C_{8-15}$ bicycloalkyl(meth)acrylate including isobornyl methacrylate and isobornyl acrylate.

The term "fixture time" as used herein refers to the time it takes for the adhesive composition to harden sufficiently between the substrates such that a partially cured bond results.

Useful polyurethanes oligomers having (meth)acrylate functionality may be selected from a wide variety of materials. For example, such polyurethane oligomers may be formed by first preparing a polyurethane oligomer by reacting an isocyanate-reactive ethylenically unsaturated monomer and an isocyanate-terminated polyurethane oligomer, which is the reaction product of a diisocyanate and an isocyanate-reactive compound having at least two isocyanate-reactive functional groups. Each of the isocyanate-reactive functional groups in the isocyanate-reactive compound having at least two isocyanate-reactive functional groups can independently be a hydroxy, amino, mercapto or a carboxy group. Such isocyanate-reactive compounds having at least two isocyanate-reactive functional groups include members of the following classes of compounds: diols, triols, diamines, aminoalcohols, and any combination thereof. Desirably, the isocyanate-reactive compound having at least two isocyanate-reactive functional groups is a diol, a triol, or a combination of a diol and a triol.

Suitable diols include linear, branched, or cyclic alkylene diols, including alkylene diols that include an arylene group as a substituent or an arylene group in the chain, polycaprolactone diols, polyester diols and polytetrahydrofurfuryl diols. Suitable diols include, in particular, linear or branched dihydric alcohols containing 2 to 22 carbon atoms selected from ethylene glycol, propane-1,2-diol, propane-1,3-diol, butane-1,2-, -1,3- or -1,4-diol, pentane-1,5-diol, 2-methylbutane-1,4-diol, 2,2-dimethylpropane-1,3-diol, hexane-1,2- or -1,6-diol, decane-1,10-dial, hydrogenated bis-phenol-A, and a combination thereof. Desirably, the isocyanate reactive compound having at least two isocyanate-reactive functional groups is hydrogenated bis-phenol-A.

The molecular weight of the isocyanate-reactive compound having at least two isocyanate-reactive functional groups is preferably in the range from about 62 to about 45,000.

Suitable triols include glycerol, butane-1,2,4-triol, trimethylol propane (2-hydroxymethyl-2-ethylpropane-1,3-diol) and trimethylol ethane (2-methyl-2-hydroxymethylpropane-1,3-diol).

The diisocyanate reactant may be any suitable aromatic or aliphatic diisocyanate, or it may be aromatic diisocyanate. Examples of such diisocyanates include 2,4-toluene diisocyanate, 2-6-toluene diisocyanate, 4,4'-diphenyl methane diisocyanate (MDI), 4,4'-dicyclohexyl diisocyanate, m- and p-tetramethyl xylylene diisocyanate, 3-isocyanatomethyl-3,5,5-trimethyl cyclohexyl isocyanate (isophorone diisocyanate), hexamethylene diisocyanate, 1,5-naphthylene diisocyanate, dianisidine diisocyanate, di-(2-isocyanatoethyl)-bicyclo[2.2.1]hept-5-ene-2,3-dicarboxylate, 2,2,4- and 2,4,4-trimethylene hexamethylene diisocyanate and mixtures thereof. Desirably, the diisocyanate may be chosen from isophorone diisocyanate, methylene-bis-phenyl diisocyanate, toluene diisocyanate, hexamethylene diisocyanate, m-tetramethylxylylene diisocyanate and mixtures thereof.

The molar ratio in the reaction of the diisocyanates with the diols may vary depending on the molecular weight desired. Preferably, the diisocyanate to diol molar ratio in the reaction of diisocyanates with diols is from about 1.1:1 to about 2:1.

The isocyanate-terminated polyurethane oligomer prepared by the methods described above may then be allowed to react with an isocyanate-reactive ethylenically unsaturated monomer, desirably a (meth)acrylate monomer, in a ratio of about one equivalent of isocyanate-reactive ethylenically unsaturated monomer per equivalent of NCO, to produce polyurethane oligomers having (meth)acrylate functionality.

The isocyanate-reactive ethylenically unsaturated monomer can be any suitable monomer that has an isocyanate-reactive functional group, such as OH, $NH_2$, SH, COOH and the like. Examples of such monomers include hydroxyethyl acrylate, hydroxyethyl methacrylate, hydroxypropyl acrylates and hydroxypropyl methacrylate, such as, 2-hydroxypropyl acrylate, 2-hydroxypropyl methacrylate, 3-hydroxyhexyl acrylate, 3-hydroxypropyl methacrylate, 6-hydroxyhexyl acrylate, 6-hydroxyhexyl methacrylate, polyethylene glycol mono-acrylate, polyethylene glycol mono-methacrylate, polyethylene glycol mono-acrylate and polypropylene glycol mono-methacrylate, hydroxyethyl vinyl ether, and a combination thereof.

Desirably, the polyurethane oligomers are (meth)acrylate encapped, but (meth)acrylate pendent groups, as well as other pendant functional groups may also be present.

Other useful polyurethane oligomers having multi-(meth)acrylate functionality also include those described in U.S. Pat. No. 3,425,988 to Gorman et al., which is herein incorporated by reference in its entirety. Still further useful polyurethane oligomers having (meth)acrylate functionality include those described in U.S. Pat. Nos. 4,018,851, 4,295,909 and 4,309,526 to Baccei. These patents are also incorporated by reference herein in their entirety. Among the useful polyurethane methacrylates described in the Baccei patents are methacrylate-capped urethane prepolymers (oligomers) which are based on graft polyols derived from the reaction between a polyol and a vinyl monomer or polymer. These include oligomers having the formula

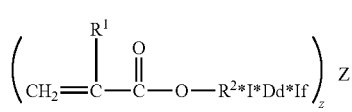

wherein $R^1$ is an alkyl $C_{1-4}$ group which may optionally be substituted, such as methyl, ethyl, propyl and butyl, hydrogen or chloro group; $R^2$ is a divalent organic radical selected from substituted or unsubstituted alkylene $C_{1-8}$, phenylene and naphthalene, all of which may be optionally substituted; I is a polyisocyanate radical; D is an aromatic, heterocyclic or cycloaliphatic polyol or polyamine radical, preferably a diol, and more preferably a diol of a cycloaliphatic compound; Z is a polymeric or copolymeric grafted alkylene ether polyol or alkylene ether polyol radical; z is an integer corresponding to the valency of Z; d is either 1 or 0; and i is 0 when d is 0, and otherwise is equal to one less than the number of reactive hydrogen atoms of D. As used herein, an asterisk (*) indicates a urethane (—N—H—COO—) or ureide (—NH—CO—NH—) bond.

Among the reaction products described in the aforementioned patents to Baccei and useful in the present invention include those which are the reaction product of (a) at least a molar equivalent of a hydroxyalkyl (meth)acrylate or an aminoalkyl (meth)acrylate with (b) the reaction product of (1) a poly(alkylene) ether polyol with (2) at least a molar equivalent of the —NCO capped reaction product of: (i) an aromatic or cycloaliphatic polyisocyanate with (ii) an aromatic or cycloaliphatic polyol or polyamine.

Also useful commercially available polyurethane (meth)acrylate resins include those sold by Sartomer Company, Inc., Exton, Pa. under the trade designations CN1963 and CN971A80.

The polyurethane oligomers having (meth)acrylate functionality may be present in amounts of from about 10% to about 80% by weight of the total weight of the composition, desirably about 20% to about 50% and more desirably about 30% to about 40% by weight.

Those maleimide-functionalized compounds which are useful include those having the following formula:

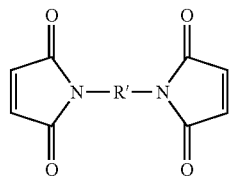

where R' is selected from alkylene, arylene, cycloalkylene, aralkylene, alkarylene and arylalkylarylene. Desirably, R' contains from about 6 to about 100 carbons and most preferably about 6 to about 50 carbon atoms.

Other useful maleimide-functionalized compounds include those having the formula

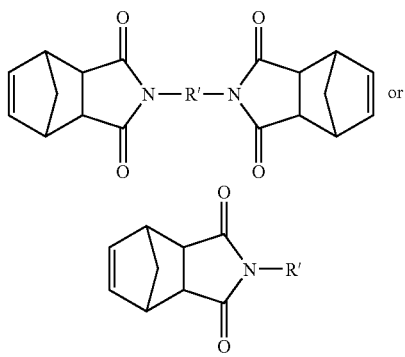

where R' is as described above.

Other useful maleimide-functionalized compounds include N-alkyl substituted maleimides such as N-methylmaleimide, N-ethylmaleimide, N-n-propylmaleimide, N-i-propylmaleimide, N-n-butylmaleimide, N-t-butylmaleimide, N-cyclohexylmaleimide, etc.; N-aryl substituted maleimides such as N-methylphenylmaleimide, chlorophenylmaleimide, N-carboxyphenylmaleimide, and N-benzylmaleimide.

Among the most desirable maleimide-functionalized compounds are those derived from bisphenol A, such as

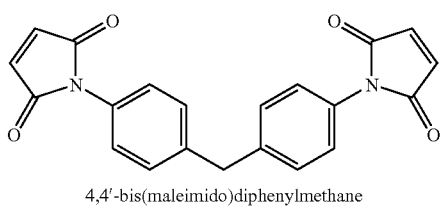

4,4'-bis(maleimido)diphenylmethane

This compound is sold under the tradename MATRIMID 5292, by Huntsman Advanced Materials, Inc., Brewster, N.Y.

Other useful maleimide-functionalized compounds include:

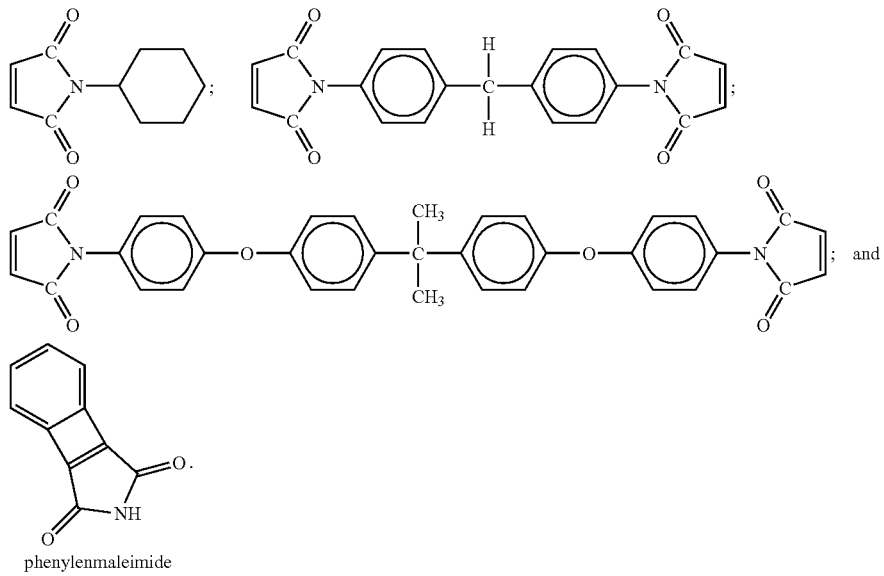

phenylenmaleimide

The maleimide-functionalized compounds may be present in amounts of about 5% to about 30% by weight of the total composition, desirably about 10% to about 30% by weight and more desirably about greater than or equal to 15% to about 25% by weight of the total composition.

Cycloalkyl(meth)acrylate ("CAMA") may be present in amounts of about 10% to about 50% by weight of the total composition. Desirably, the CAMA is present in amounts of greater than or equal to 20% to about 50% by weight of the total composition. Most desirably the cycloalkyl(meth)acrylate is CHMA.

It has been found that particularly good high temperature properties are developed when the cycloalkyl(meth)acrylate is present in amounts of 20% or more and the maleimide-functionalized compound is present in amounts of 15% or more, by weight of the total composition. Thus, a ratio of 1.33:1 or greater of CAMA to the maleimide-functionalized compound is desirable.

A general composition of the invention is provided below:

| Component | % by Weight |
| --- | --- |
| Polyurethane oligomer having (meth)acrylate functionality | 10-80% |
| Cycloalkyllmethacrylate | 10-50% |
| Maleimide-functionalized compound | 5-30% |
| Reactive comonomer or diluent | 7-30% |
| Rubber toughness (hypalon, vamac, polybutadiene) | 10-30% |
| Organic acid | 0.2-4.0% |
| Curing Agents (Initiators, calatysts) | 0.2-5.0% |
| Stabilizers | 0.1-3.0% |
| Silica filler | 2-10% |

The compositions may be prepared in one part or two parts, where the first part includes the curable portion and the second part includes a surface activator. In the two part compositions, ordinarily, the respective parts are disposed within separate containers and the contents of each of which are expressed and mixed prior to application.

Similarly, the compositions may also be applied to a substrate in one step or two steps. In the one-step process, the curable composition as described herein is applied one or both substrates to be mated or between the two substrates, and permitted to cure. In the two-step process, a surface activator or cure accelerator is applied to the substrate surface or directly to the composition on the substrate.

In some aspects of the invention, a double barrel syringe equipped with a mixing nozzle may be used to mix and dispense the composition when it is presented in two parts.

Useful accelerators may be chosen from a wide variety of materials including amines such as primary, secondary, or tertiary amines, and hydrazines such as acetylphenylhydrazine (APH). Surface activators such as Cu metal, Cu(I) salts, Cu(I) complexes, Cu(II) salts and Cu(II) complexes may be used.

Other useful copper activators include copper metal, cuprous or cupric oxide, cuprous or cupric halide, cuprous or cupric sulfate, cuprous or cupric methanesulfonate, cuprous or cupric arylsulfonate, cuprous or cupric trifluoromethanesulfonate, a cuprous or cupric carboxylate, such as, copper acetate, copper benzoate, copper octoate, copper naphthenate and copper ethyl hexanoate; pentafluorophenyl copper(I), copper acetoacetate and, in particular, copper acetyl acetonate. Desirably, the copper activator is soluble in the composition to produce a homogeneous adhesive composition. However, less soluble or substantially insoluble copper activators can also be used.

The presence of an activator in conjunction with the adhesive composition of the present invention is optional. Thus, the one component adhesive composition of the present invention does not contain an activator. In contrast, the two component adhesive composition does contain an activator, which is kept apart from the remaining components of the composition, particularly apart from the free radical initiator components, which include peroxide and any catalyst present, to prevent premature polymerization.

In the two component adhesive composition of the present invention, the second component includes an activator. Desirably, a copper activator is used. The copper activator can be added neat, either as a solid or as a liquid. More conveniently however, the copper activator is mixed with the polyurethane oligomer having multi-(meth)acrylate functionality, the cycloalkyl(meth)acrylate and the maleimide-functionalized compound prior to application onto the surface of a substrate that is coated therewith.

The copper activator may be used in amounts of from about 0.001% to about 3%, desirably 0.01% to about 1% by weight of the total adhesive composition.

Other agents such as thickeners, plasticizers, viscosity modifiers, emulsifiers, diluents, thixotropic agents, dyes, pigments and fillers, known in the art may advantageously be incorporated where functionally desirable, provided only that they do not interfere with the functioning of the composition for its intended purpose, which can be determined by simple experimentation. Thus, the adhesive compositions according to the present invention may also contain additional additives know in the art to obtain desirable effects for the particular application envisaged.

The inhibitors are usually selected from hydroquinones, benzoquinones, naphthoquinones, phenanthraquinones, anthraquinones and any substituted compounds thereof. Various phenols may also be used as inhibitors, with 2,6-di-tert-butyl-4-methylphenol being preferred. The inhibitors may be effectively used in quantities of about 0.1% to about 1% by weight of the total composition without adverse effect on the curing rate of the polymerizable adhesive composition. Emulsifiers may be added to improve the compatibility of all the components. Thickeners, plasticizers, diluents, thixotropy conferring agents and other additives may be added in the usual manner and quantities to achieve the required viscosity levels. Preferably, the viscosity of the adhesive composition is from about 1,000 cps to about 50,000 cps.

The adhesive compositions of the present invention exhibit enhanced high temperature strength of adhesion to metal surfaces, such as steel, brass, zinc, copper and aluminum, irrespective of whether the metal surfaces are smooth or have merely been degreased with acetone, or chromated or corundum-blasted.

The inventive compositions may additionally contain one or more ethylenically unsaturated comonomers, which are generally known as reactive monomers, comonomers, or diluents. Preferably, the ethylenically unsaturated comonomer is an acrylate or methacrylate ester. Examples of the ethylenically unsaturated comonomer include hydroxyethyl acrylate, hydroxyethyl methacrylate, hydroxypropyl acrylate, such as, 2- or 3-hydroxypropyl acrylate, hydroxypropyl methacrylate, such as, 2- or 3-hydroxypropyl methacrylate, hydroxyethyl vinyl ether, styrene, substituted styrene, alpha-methylstyrene, isobornyl acrylate, isobornyl methacrylate acrylate ester of a linear, branched or cyclic alcohol of 1 to 22 carbon atoms, methacrylate ester of a linear, branched or cyclic alcohol of 1 to 22 carbon atoms, acrylonitrile, acrylamide, methacrylamide, vinyl ester, alkyl vinyl ether and a combination thereof. Additional suitable examples include allyl acrylate, allyl methacrylate, 6-hydroxyhexyl acrylate, 6-hydroxyhexyl methacrylate, benzyl methacrylate, phenyl ethyl methacrylate, 2-phenoxyethyl methacrylate, morpholinoethyl methacrylate, dimethyl aminoethyl methacrylate, glycidyl methacrylate, piperidyl acrylamide, neopentyl methacrylate, tert-butyl methacrylate, tetrahydrofurfuryl methacrylate, bisphenol-A-acrylate, bisphenol.-A-methacrylate, maleic acid mono-ester, phthalic acid monoester and mixtures thereof. While methyl methacrylate may be used, it is often not used to avoid odor problems.

More preferably, the ethylenically unsaturated comonomers that are suitable for use are selected from hydroxyethyl acrylate, hydroxyethyl methacrylate, hydroxypropyl acrylate, hydroxypropyl methacrylate, isobornyl acrylate, isobornyl methacrylate and a combination thereof.

The ethylenically unsaturated comonomer may be present in amounts from about 10% to about 60% by weight of the total composition.

The adhesive compositions of the present invention cure via a free radical initiator mechanism. Accordingly, the composition desirably includes a peroxide initiator. Useful initiators are any of a wide variety of known peroxy compounds, such as, hydrogen peroxide, alkyl peroxides, alkyl hydroperoxides, aralkyl hydroperoxides, peroxyesters and a combination thereof. Illustrative of such initiators are the diacyl peroxides such as benzoyl peroxide; dialkyl peroxides such as di-t-butyl peroxide; ketone peroxides such as methylethyl ketone peroxides; peresters which readily hydrolyze, e.g., t-butyl peracetate, t-butylperbenzoate, di-t-butyldiperphthalate; and peroxycarbonates, i.e., reaction products of isocyanates and hydroperoxides. Particularly useful classes of peroxy initiators include the organic hydroperoxides, such as, cumyl hydroperoxide, methyl ethyl ketone hydroperoxide and t-butyl hydroperoxide. A particularly useful free-radical initiator is t-butylperbenzoate.

It is known to those skilled in the art that hydroperoxides can also be generated in-situ by, for example, aeration of some (meth)acrylic ester monomers and other easily oxidizable compounds.

The free-radical initiator may be present in amounts sufficient to initiate cure at room temperature. Generally, the aforementioned peroxy initiators may be present in amounts of from about 0.1% to about 5.0% by weight of the total composition.

The adhesive composition of the present invention may also include an organic acid having a $pK_a$ of about 12 or less. Examples of such acids include sulfimides, sulfonamides, citric acid, maleic acid, succinic acid, phthalic acid, higher molecular weight, odorless carboxylic acids, di-carboxylic acid, anhydrides thereof, such as maleic anhydride, maleic dianhydride, succinic anhydride, and phthalic anhydride, and a combination thereof.

Most desirably, the composition includes saccharin and at least one acid selected from citric acid, maleic acid, succinic acid, and phthalic acid and optionally at least one anhydride selected from phthalic anhydride, maleic anhydride, and succinic anhydride.

EXAMPLES

Compositions were made in accordance with the Table I below. The control formulations contain representative block resin polyurethane acrylates, such as those described in U.S. Pat. Nos. 4,309,526; 4,295,909; and 4,018,851, used in commercial acrylic products such as LOCTITE-brand 325 structural adhesive. The control did not contain a CAMA or a maleimide-functionalized compound.

Compositions A-C represent examples of the invention. These compositions contained a combination of CHMA and a maleimide-functionalized compound, the latter specifically being the maleimide derivatized compound of bisphenol-A, sold by Hunstman Advanced Materials, Inc. under the trade name MATRIMID 5292.

In all cases, the compositions were applied to their respective substrates and permitted to cure at room temperature for about 24 hours.

TABLE I

| | Compositions (% by weight) | | | |
|---|---|---|---|---|
| Component | Control | A | B | C |
| Polyurethane acrylate | 79.0[1] | 29[1] | 27[2] | 29[3] |
| Maleimide-functionalized compound[5] | — | 15 | 15 | 15 |
| Cyclohexyl methacrylate (CHMA) | — | 16 | 16 | 16 |
| Reactive diluent[6] | 10 | 10.3 | 10.3 | 10.3 |
| Hydroquinone | 0.6 | 0.6 | — | — |
| Butylated hydroxytoluene | 0.5 | 0.5 | 0.5 | 0.5 |
| Rubber toughener[4] | — | 16 | 16 | 16 |
| Silica Filler | — | 8 | 8 | 8 |
| Cure System | | | | |
| Maleic acid | 2.0 | 1.6 | 1.4 | 1.4 |
| Saccharin | 1.1 | 0.4 | 0.4 | 0.4 |
| T-butyl perbenzyote | 3.2 | 2.6 | 2.6 | 2.6 |
| Performance Tests | | | | |
| Fixture Time | | | | |
| (secs) on steel | 25 | 20-40 | 15-25 | 20-30 |
| Initial Lap Shear (psi) | | | | |
| Steel | 2814 | 2936 | 3129 | 2969 |
| Al | 1872 | 1964 | 1826 | 1211 |
| Zn-dichromate | 585 | 1030 | 1173 | 582 |
| Steel Galvanized | — | 1895 | — | — |
| Heat Age (psi) | | | | |
| @150° C. 10 days | 759 | 2126 | 2361 | 1985 |
| @120° F./95 RH 10 days | 795 | 1985 | 2117 | 1932 |
| Hot Strength (psi) | | | | |
| @150° C. steel (psi) | 123 | 345-442* | 350 | 684 |

[1]Stock Solution (Henkel)
[2]aliphatic urethane methacrylate blended with 25% trimethylol propane trimethacrylate (Sartomer CN 1963)
[3]aromatic urethane methacrylate blended with 20% trimethylolpropane trimethyacrylate (Sartomer CN971A80)
[4]20% ethylene acrylic elastomer (Vamac 55, Dupont) in CHMA
[5]Maleimide functionalized Bisphenol A (Matrimid 5292, Huntsman Advanced Materials)
[6]Hydroxy methacrylate
*range for 5 specimens The amount of polyurethane acrylate oligomer of the inventive compositions was substantially lower than that of the control in order to incorporate both the CHMA and maleimide into the composition. Notwithstanding the decrease in the oligomer, the initial lap shear strengths, conducted at room temperature on various substrates, were either comparable to the control, or represented a substantial increase in strength.

As noted from the table, the fixture times for the inventive compositions were also comparable to the control.

With respect to high temperature properties, the inventive compositions demonstrated substantial increases in tensile strength after heat aging for 10 days at 150° C. The heat aging tensile strength increased from 2.6-3.1 times higher.

Additionally, tensile strength was tested under heat and humidity conditions for all compositions. As indicated by the table, substantial increases in tensile strength were demonstrated by the inventive compositions as compared to the control. The inventive composition exhibited 2.4-2.6 times greater lap shear strength when subjected to 120° F./95% relative humidity for 10 days.

A hot strength evaluation was also conducted. Lap shear specimens were pulled in a chamber which was regulated to a temperature of 150° C. When the specimen reached this temperature, tensile lap shear strength was tested. As evidenced by the data, tensile hot strength increased 2.8-5.5 times with the inventive compositions as compared to the control.

It is clear from the above table that the presence of the CHMA and maleimide produced greatly enhanced hot strength properties, which maintaining fixture time and initial tensile strength, as well as occurring at room temperature cure conditions.

What is claimed is:

1. A room temperature cure adhesive composition comprising:
   a) at least one polyurethane oligomer having (meth)acrylate functionality present in an amount of from about 25% to about 30% by weight of the total composition;
   b) a reactive monomer comprising cycloalkyl(meth)acrylate present in an amount of from about 10% to about 50% by weight of the total composition;
   c) at least one maleimide-functionalized compound present in an amount of from about 15% to about 30% by weight of the total composition; and
   d) a cure system comprising at least one free-radical initiator.

2. The composition of claim 1, wherein the cycloalkyl (meth)acrylate is selected from the group consisting of cyclohexylmethacrylate, cyclohexylacrylate, isobornyl methacrylate, isobornyl acrylate and combinations thereof.

3. The composition of claim 1, wherein the reactive monomer is present from about 20% to about 50% by weight of the total composition.

4. The composition of claim 1, wherein the maleimide-functionalized compound is 4,4'-bis(maleimido)diphenyl-methane.

5. The composition of claim 1, wherein the maleimide-functionalized compound corresponds to the formula

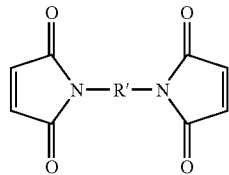

wherein R' is selected from the group consisting of alkylene, arylene, cycloalkylene, aralkylene, alkarylene and arylalkylarylene.

6. The composition of claim 1, further including a rubber toughener material.

7. The composition of claim 6, wherein the rubber toughener is in solution or admixture with the reactive monomer.

8. The composition of claim 1, wherein the polyurethane oligomer having (meth)acrylate functionality comprises a (meth)acrylate-capped polyurethane.

9. The composition of claim 1, wherein the polyurethane oligomer having (meth)acrylate functionality is the reaction product of an isocyanate-terminated polyurethane oligomer and an isocyanate-reactive ethylenically unsaturated compound.

10. The composition of claim 9, wherein the polyurethane oligomer is the reaction product of diisocyanate and an isocyanate-reactive compound having at least two isocyanate reactive functional groups selected from the groups consisting of hydroxy, amino, mercapto, carboxy and combinations thereof.

11. The composition of claim 8, wherein the (meth)acrylate functionality is selected from the group consisting of hydroxyethyl acrylate, hydroxyethyl methacrylate, hydroxypropyl acrylate, hydroxypropyl methacrylate, hydroxyethyl vinyl ether, isobornyl acrylate, isobornyl methacrylate, (meth)acrylate ester if a linear, branched or cyclic alcohol of 1 to 22 carbon atoms, acrylamide, methyacrylimide and combinations thereof.

12. The compositions of claim 1, wherein the cure system further comprises an organic acid and saccharin salt.

13. The composition of claim 1, wherein the free radical initiator is selected from the group consisting of hydrogen peroxide, alkyl peroxide, alkyl hydroperoxide, aralkyl peroxide, peroxyester and combinations thereof.

14. The composition of claim 1, further including a hydroquinone stabilizer.

15. The composition of claim 1, further including an antioxidant.

16. A process for preparing a room temperature curing adhesive composition having high temperature properties when cured, said process comprising:
   combining at least one polyurethane oligomer having (meth)acrylate functionality, in amounts of about 25% to about 30% by weight, a reactive monomer comprising cycloalkyl(meth)acrylate present in amounts of about 10% to about 50% by weight; at least one maleimide-functionalized compound present in amounts of about 15% to about 30% by weight, and a cure system comprising at least one peroxide in an amount sufficient to initiate room temperature cure.

17. A method of bonding a first substrate and to a second substrate to form a bonded composite thereof, said method comprising the steps of:
   (i) providing a composition comprising:
      a) at least one polyurethane oligomer having (meth)acrylate functionality; in amounts of about 25% to about 30% by weight;
      b) a reactive monomer comprising cycloalkyl(meth)acrylate present in the amount of about 10 to about 50% by weight;
      c) at least one maleimide-functionalized compound present in the amount of about 15% to about 30% by weight; and
      d) a cure system comprising at least one peroxide;
   (ii) applying said composition to a surface on at least one of said first or second substrates;
   (iii) matingly engaging said first and second substrate at said surface; and
   (iv) permitting the composition to cure.

18. A process for preparing a room temperature curing adhesive having high temperature properties when cured comprising
   b) combining at least one polyurethane oligomer having (meth)acrylate functionality present in an amount of from about 25% to about 30% by weight of the total composition, a reactive monomer comprising cycloalkyl (meth)acrylate in an amount of from about 10% to about 50% by weight of the total composition, a maleimide-functionalized compound present in an amount of from about 15% to about 30% by weight of the total composition and at least one peroxide as a first component;
   c) providing a surface activator to produce a second component; and
   d) contacting said first and second components to produce said room temperature curing adhesive having high temperature properties.

* * * * *